US006580819B1

(12) United States Patent
Rhoads

(10) Patent No.: US 6,580,819 B1
(45) Date of Patent: Jun. 17, 2003

(54) METHODS OF PRODUCING SECURITY DOCUMENTS HAVING DIGITALLY ENCODED DATA AND DOCUMENTS EMPLOYING SAME

(75) Inventor: Geoffrey B. Rhoads, West Linn, OR (US)

(73) Assignee: Digimarc Corporation, Tualatin, OR (US)

( * ) Notice: Subject to any disclaimer, the term of this patent is extended or adjusted under 35 U.S.C. 154(b) by 0 days.

(21) Appl. No.: 09/287,940

(22) Filed: Apr. 7, 1999

Related U.S. Application Data

(63) Continuation-in-part of application No. 08/967,693, filed on Nov. 12, 1997, which is a continuation of application No. 08/614,521, filed on Mar. 15, 1996, now Pat. No. 5,745,604, which is a continuation of application No. 08/215,289, filed on Mar. 17, 1994, now abandoned, which is a continuation-in-part of application No. 08/154,866, filed on Nov. 18, 1993, now abandoned, which is a continuation-in-part of application No. 08/951,858, filed on Oct. 16, 1997, which is a continuation-in-part of application No. 08/327,426, filed on Oct. 21, 1994, now Pat. No. 5,768,426.

(60) Provisional application No. 60/082,228, filed on Apr. 16, 1998.

(51) Int. Cl.[7] .................. G06K 9/00

(52) U.S. Cl. .................. 382/135; 194/212; 356/71

(58) Field of Search .................. 382/100, 112, 382/135, 137, 138, 151, 154, 732, 250, 294; 380/54, 201; 283/72, 85; 427/7; 428/29; 194/212; 356/71

(56) References Cited

U.S. PATENT DOCUMENTS

| | | | | |
|---|---|---|---|---|
| 3,493,674 A | 2/1970 | Houghton | ........ | 348/478 |
| 3,576,369 A | 4/1971 | Wick et al. | ........ | 355/77 |
| 3,585,290 A | 6/1971 | Sanford | ........ | 348/478 |
| 3,655,162 A | 4/1972 | Yamamoto et al. | ........ | 249/219.2 |
| 3,703,628 A | 11/1972 | Philipson, Jr. | ........ | 235/432 |

(List continued on next page.)

FOREIGN PATENT DOCUMENTS

| | | |
|---|---|---|
| DE | 2943436 | 5/1981 |
| DE | 3806411 | 9/1989 |
| DE | 19521969 C1 | 2/1997 |
| EP | 366381 A2 | 10/1989 |
| EP | 372 601 | 6/1990 |

(List continued on next page.)

OTHER PUBLICATIONS

Tirkel et al, "Electronic Water Mark," DICTA–93, Macquarie University, Sydney, Australia, Dec., 1993, pp. 666–672.
Allowed claims from U.S. patent application No. 09/293, 601.

(List continued on next page.)

*Primary Examiner*—Jayanti K. Patel
(74) *Attorney, Agent, or Firm*—William Y. Conwell; Digimarc Corporation

(57) ABSTRACT

Machine readable data is digitally watermarked into banknotes by slight alterations to ink color, density, distribution, etc., or by texturing the microtopology of the banknote surface. Such watermarking can be optically sensed and detected by scanners, photocopiers, or printers. In response, such devices can intervene to prevent banknote reproduction. This arrangement addresses various problems, e.g., the use of digital image editing tools to circumvent prior art banknote anti-copy systems. In some embodiments, visible structures characteristic of banknotes are also detected (e.g. by pattern recognition analysis of image data), and reproduction can be halted if either the visible structures or the digital watermark data are detected. In other embodiments, automatic teller machines that accept, as well as dispense, banknotes can check for the presence of digitally watermarked data to help confirm the authenticity of banknotes input to the machines. In other embodiments, scanners, printers and photocopiers can be provided with digital watermarking capabilities so that image data, or printed output, produced by such devices includes digital watermark data, permitting subsequent identification of the particular device used.

39 Claims, 3 Drawing Sheets

U.S. PATENT DOCUMENTS

| | | | | |
|---|---|---|---|---|
| 3,805,238 A | | 4/1974 | Rothfjell | |
| 3,809,806 A | | 5/1974 | Walker et al. | 347/260 |
| 3,838,444 A | | 9/1974 | Loughlin et al. | 348/486 |
| 3,914,877 A | | 10/1975 | Hines | 380/54 |
| 3,922,074 A | | 11/1975 | Ikegami et al. | 380/54 |
| 3,971,917 A | | 7/1976 | Maddox et al. | 235/462.39 |
| 3,977,785 A | | 8/1976 | Harris | 355/133 |
| 3,982,064 A | | 9/1976 | Barnaby | 348/468 |
| 4,025,851 A | | 5/1977 | Haselwood et al. | 725/22 |
| 4,184,700 A | | 1/1980 | Greenaway | 283/91 |
| 4,225,967 A | | 9/1980 | Miwa et al. | 455/68 |
| 4,231,113 A | | 10/1980 | Blasbalg | 380/34 |
| 4,252,995 A | | 2/1981 | Schmidt et al. | 381/14 |
| 4,262,329 A | | 4/1981 | Bright et al. | 713/164 |
| 4,297,729 A | | 10/1981 | Steynor et al. | 360/40 |
| 4,389,671 A | | 6/1983 | Posner et al. | 380/235 |
| 4,416,001 A | | 11/1983 | Ackerman et al. | 369/44.18 |
| 4,423,415 A | | 12/1983 | Goldman | 386/95 |
| 4,476,468 A | | 10/1984 | Goldman | 340/5.86 |
| 4,523,508 A | | 6/1985 | Ruell | 89/7 |
| 4,553,261 A | | 11/1985 | Froessl | 382/306 |
| 4,571,489 A | | 2/1986 | Watanabe | 235/379 |
| 4,590,366 A | | 5/1986 | Rothfjell | 235/494 |
| 4,595,950 A | | 6/1986 | Lofberg | 380/202 |
| 4,618,257 A | | 10/1986 | Bayne et al. | 356/71 |
| 4,637,051 A | | 1/1987 | Clark | 382/101 |
| 4,639,779 A | | 1/1987 | Greenberg | 348/460 |
| 4,647,974 A | | 3/1987 | Butler et al. | 725/36 |
| 4,654,867 A | | 3/1987 | Labedz et al. | 455/438 |
| 4,660,221 A | | 4/1987 | Dlugos | 705/62 |
| 4,663,518 A | | 5/1987 | Borror et al. | 235/487 |
| 4,665,431 A | | 5/1987 | Cooper | 348/480 |
| 4,677,435 A | | 6/1987 | D'Agraives et al. | 710/1 |
| 4,682,794 A | | 7/1987 | Margolin | 380/212 |
| 4,689,477 A | | 8/1987 | Goldman | |
| 4,703,476 A | | 10/1987 | Howard | 370/491 |
| 4,712,103 A | | 12/1987 | Gotanda | 340/5.53 |
| 4,718,106 A | | 1/1988 | Weinblatt | 455/201 |
| 4,723,149 A | | 2/1988 | Harada | 399/183 |
| 4,739,377 A | | 4/1988 | Allen | 355/133 |
| 4,765,656 A | | 8/1988 | Becker et al. | 283/70 |
| 4,775,901 A | | 10/1988 | Nakano | 725/124 |
| 4,776,013 A | | 10/1988 | Kafri et al. | 380/54 |
| 4,805,020 A | | 2/1989 | Greenberg | 348/460 |
| 4,811,357 A | | 3/1989 | Betts et al. | 375/130 |
| 4,811,408 A | | 3/1989 | Goldman | 382/15 |
| 4,820,912 A | | 4/1989 | Samyn | 340/310.07 |
| 4,835,517 A | | 5/1989 | van der Gracht et al. | 380/51 |
| 4,864,618 A | | 9/1989 | Wright et al. | 707/9 |
| 4,866,771 A | | 9/1989 | Bain | 707/9 |
| 4,874,936 A | | 10/1989 | Chandler et al. | 235/494 |
| 4,876,617 A | | 10/1989 | Best et al. | 360/60 |
| 4,884,139 A | | 11/1989 | Pommier | 348/21 |
| 4,885,632 A | | 12/1989 | Mabey et al. | 725/20 |
| 4,903,301 A | | 2/1990 | Kondo et al. | 704/501 |
| 4,918,484 A | | 4/1990 | Ujiie et al. | 355/41 |
| 4,920,503 A | | 4/1990 | Cook | 348/552 |
| 4,921,278 A | | 5/1990 | Shiang et al. | 283/87 |
| 4,939,515 A | | 7/1990 | Adelson | 235/456 |
| 4,941,150 A | | 7/1990 | Iwasaki | 375/145 |
| 4,943,973 A | | 7/1990 | Werner | 375/141 |
| 4,943,976 A | | 7/1990 | Ishigaki | 375/142 |
| 4,963,998 A | | 10/1990 | Maufe | 360/60 |
| 4,965,827 A | | 10/1990 | McDonald | 705/65 |
| 4,967,273 A | | 10/1990 | Greenberg | 725/22 |
| 4,972,471 A | | 11/1990 | Gross et al. | 455/2.01 |
| 4,972,475 A | | 11/1990 | Sant'Anselmo | 380/54 |
| 4,972,476 A | | 11/1990 | Nathans | |
| 4,979,210 A | | 12/1990 | Nagata et al. | 360/60 |
| 4,993,068 A | | 2/1991 | Piosenka et al. | |
| 4,996,530 A | | 2/1991 | Hilton | 341/120 |
| 5,003,590 A | | 3/1991 | Lechner et al. | 380/204 |
| 5,010,405 A | | 4/1991 | Schreiber et al. | 348/432.1 |
| 5,034,982 A | | 7/1991 | Heninger et al. | 380/54 |
| 5,036,513 A | | 7/1991 | Greenblatt | 370/259 |
| 5,040,059 A | | 8/1991 | Leberl | |
| 5,062,666 A | * | 11/1991 | Mowry et al. | 283/67 |
| 5,063,446 A | | 11/1991 | Gibson | 348/484 |
| 5,073,899 A | | 12/1991 | Collier et al. | 375/135 |
| 5,073,925 A | | 12/1991 | Nagata et al. | 360/60 |
| 5,075,773 A | | 12/1991 | Pullen et al. | 375/240.01 |
| 5,077,608 A | | 12/1991 | Dubner | 348/583 |
| 5,077,795 A | | 12/1991 | Rourke et al. | 380/55 |
| 5,079,648 A | | 1/1992 | Maufe | 360/31 |
| 5,091,966 A | | 2/1992 | Bloomberg et al. | 382/203 |
| 5,113,437 A | | 5/1992 | Best | 380/253 |
| 5,128,525 A | | 7/1992 | Stearns et al. | 235/454 |
| 5,144,660 A | | 9/1992 | Rose | 713/200 |
| 5,148,498 A | | 9/1992 | Resnikoff et al. | 382/248 |
| 5,150,409 A | | 9/1992 | Elsner | 713/177 |
| 5,161,210 A | | 11/1992 | Druyvesteyn et al. | 704/200 |
| 5,166,676 A | | 11/1992 | Milheiser | 340/10.34 |
| 5,168,146 A | | 12/1992 | Bloomberg | 235/133 R |
| 5,185,736 A | | 2/1993 | Tyrrell et al. | 370/358 |
| 5,199,081 A | | 3/1993 | Saito et al. | 382/116 |
| 5,212,551 A | | 5/1993 | Conanan | 348/484 |
| 5,216,724 A | | 6/1993 | Suzuki et al. | |
| 5,228,056 A | | 7/1993 | Schilling | 375/144 |
| 5,243,411 A | | 9/1993 | Shirochi et al. | 348/473 |
| 5,245,165 A | | 9/1993 | Zhang | 235/454 |
| 5,245,329 A | | 9/1993 | Gokcebay | 340/533 |
| 5,247,364 A | | 9/1993 | Banker et al. | 348/569 |
| 5,253,078 A | | 10/1993 | Balkanski et al. | 382/250 |
| 5,257,119 A | | 10/1993 | Funada et al. | 358/438 |
| 5,267,334 A | | 11/1993 | Normille et al. | 382/236 |
| 5,291,243 A | * | 3/1994 | Heckman et al. | 355/201 |
| 5,293,399 A | | 3/1994 | Hefti | 340/10.34 |
| 5,299,019 A | | 3/1994 | Pack et al. | 382/236 |
| 5,305,400 A | | 4/1994 | Butera | 382/107 |
| 5,319,453 A | | 6/1994 | Copriviza et al. | |
| 5,319,724 A | | 6/1994 | Blonstein et al. | 713/200 |
| 5,319,735 A | | 6/1994 | Preuss et al. | 704/205 |
| 5,321,470 A | | 6/1994 | Hasuo et al. | 355/201 |
| 5,325,167 A | | 6/1994 | Melen | 356/71 |
| 5,327,237 A | | 7/1994 | Gerdes et al. | 348/476 |
| 5,337,361 A | | 8/1994 | Wang et al. | 380/51 |
| 5,337,362 A | | 8/1994 | Gormish et al. | 380/54 |
| 5,349,655 A | | 9/1994 | Mann | 714/6 |
| 5,351,302 A | | 9/1994 | Leighton et al. | 380/30 |
| 5,371,792 A | | 12/1994 | Asai et al. | 705/59 |
| 5,374,976 A | | 12/1994 | Spannenburg | 399/366 |
| 5,379,345 A | | 1/1995 | Greenberg | |
| 5,384,846 A | | 1/1995 | Berson et al. | |
| 5,387,941 A | | 2/1995 | Montgomery et al. | 348/473 |
| 5,394,274 A | | 2/1995 | Kahn | 360/27 |
| 5,396,559 A | | 3/1995 | McGrew | 380/54 |
| 5,398,283 A | | 3/1995 | Virga | 380/243 |
| 5,404,160 A | | 4/1995 | Schober et al. | 725/20 |
| 5,404,377 A | | 4/1995 | Moses | 375/145 |
| 5,408,542 A | | 4/1995 | Callahan | 382/244 |
| 5,416,307 A | | 5/1995 | Danek et al. | 235/439 |
| 5,418,853 A | | 5/1995 | Kanota et al. | 380/203 |
| 5,422,963 A | | 6/1995 | Chen et al. | 382/232 |
| 5,422,995 A | | 6/1995 | Aoki et al. | 345/545 |
| 5,425,100 A | | 6/1995 | Thomas et al. | 725/20 |
| 5,428,606 A | | 6/1995 | Moskowitz | 370/400 |
| 5,432,542 A | | 7/1995 | Thibadeau et al. | 725/35 |
| 5,432,870 A | | 7/1995 | Schwartz | 382/232 |
| 5,446,273 A | | 8/1995 | Leslie | |
| 5,446,488 A | | 8/1995 | Leslie | 725/151 |
| 5,450,122 A | | 9/1995 | Keene | 725/22 |

5,450,490 A 9/1995 Jensen et al. ................. 380/53
5,461,426 A 10/1995 Limberg et al. ............ 348/475
5,469,222 A 11/1995 Sprague
5,469,506 A 11/1995 Berson et al.
5,471,533 A 11/1995 Wang et al.
5,473,631 A 12/1995 Moses ........................ 375/130
5,479,168 A 12/1995 Johnson et al. ............. 341/110
5,481,294 A 1/1996 Thomas et al. ............... 725/20
5,488,664 A 1/1996 Shamir ........................ 380/54
5,499,294 A 3/1996 Friedman .................... 713/179
5,515,081 A 5/1996 Vasilik ....................... 345/545
5,521,722 A * 5/1996 Colvill et al. ............... 358/500
5,524,933 A 6/1996 Kunt et al. ................... 283/67
5,530,751 A 6/1996 Morris ....................... 380/202
5,532,920 A 7/1996 Hartrick et al. ............ 715/500
5,537,223 A 7/1996 Curry ......................... 358/328
5,539,471 A 7/1996 Myhrvold et al. .......... 348/734
5,539,735 A 7/1996 Moskowitz ................. 370/420
5,541,662 A 7/1996 Adams et al. .............. 348/460
5,541,741 A 7/1996 Suzuki ....................... 358/450
5,544,255 A 8/1996 Smithies et al. ............ 382/119
5,548,646 A 8/1996 Aziz et al. .................. 713/153
5,557,333 A 9/1996 Jungo et al. ................ 348/473
5,559,559 A 9/1996 Jungo et al. ............. 348/432.1
5,568,179 A 10/1996 Diehl et al. ................ 725/143
5,568,550 A 10/1996 Ur ............................ 382/306
5,568,570 A 10/1996 Rabbani ..................... 382/238
5,572,010 A 11/1996 Petrie ........................ 235/494
5,572,247 A 11/1996 Montgomery et al. ...... 725/139
5,576,532 A 11/1996 Hecht ........................ 235/494
5,579,124 A 11/1996 Aijala et al. .................. 386/96
5,582,103 A 12/1996 Tanaka et al. ................ 101/32
5,587,743 A 12/1996 Montgomery ............... 348/473
5,590,197 A 12/1996 Chen et al. ................... 205/65
5,602,920 A 2/1997 Bestler et al. .............. 380/212
5,606,609 A 2/1997 Houser et al. .............. 713/179
5,611,575 A 3/1997 Petrie .......................... 283/67
5,613,004 A 3/1997 Cooperman et al. .......... 380/28
5,613,012 A 3/1997 Hoffman et al. ............ 382/115
5,614,940 A 3/1997 Cobbley et al. ............ 725/138
5,617,148 A 4/1997 Montgomery ............... 348/473
5,629,770 A 5/1997 Brassil .................. 358/426.12
5,629,980 A 5/1997 Stefik et al. .................. 705/54
5,636,292 A 6/1997 Rhoads ....................... 382/232
5,638,446 A 6/1997 Rubin ......................... 705/51
5,646,997 A 7/1997 Barton
5,652,626 A 7/1997 Kawakami et al. ......... 348/463
5,659,726 A 8/1997 Sandford
5,661,574 A 8/1997 Kawana ...................... 358/501
5,666,487 A 9/1997 Goodman et al. .......... 709/246
5,687,236 A 11/1997 Moskowitz et al. .......... 380/28
5,710,636 A 1/1998 Curry ......................... 358/298
5,721,788 A 2/1998 Powell et al.
5,727,092 A 3/1998 Sandford, II et al. ....... 382/251
5,735,547 A * 4/1998 Morelle et al. ............... 283/67
5,745,604 A 4/1998 Rhoads ....................... 382/232
5,751,854 A * 5/1998 Saitoh et al. ............... 382/218
5,761,686 A 6/1998 Bloomberg ................. 707/529
5,768,426 A 6/1998 Rhoads
5,790,693 A 8/1998 Graves et al. .............. 382/135
5,790,697 A 8/1998 Munro et al. ............... 382/135
5,817,205 A * 10/1998 Kaule ......................... 156/233
5,822,436 A 10/1998 Rhoads
5,832,119 A 11/1998 Rhoads
5,841,886 A 11/1998 Rhoads
5,850,481 A 12/1998 Rhoads
5,871,615 A 2/1999 Harris ........................ 162/140
5,905,810 A 5/1999 Jones et al. ................. 382/135
6,024,287 A 2/2000 Takai et al.
6,095,566 A 8/2000 Yamamoto
6,166,750 A * 12/2000 Negishi ...................... 347/131
6,188,787 B1 2/2001 Ohmae et al.
6,243,480 B1 6/2001 Zhao et al.
6,292,092 B1 9/2001 Chow
6,301,360 B1 10/2001 Bocionek et al.
6,321,648 B1 11/2001 Berson et al.
6,321,981 B1 11/2001 Ray et al.
6,332,031 B1 12/2001 Rhoads et al. .............. 382/100
6,343,138 B1 1/2002 Rhoads ....................... 382/100
6,343,204 B1 1/2002 Yang
6,345,104 B1 2/2002 Rhoads ....................... 382/100
6,359,985 B1 3/2002 Koch et al.
2001/0017709 A1 8/2001 Murakami et al.
2001/0024510 A1 9/2001 Iwamura
2001/0026629 A1 10/2001 Oki
2001/0030759 A1 10/2001 Hayashi et al.
2001/0053299 A1 12/2001 Matsunoshita et al.
2002/0003891 A1 1/2002 Hoshino
2002/0018228 A1 2/2002 Torigoe
2002/0051237 A1 5/2002 Ohara

FOREIGN PATENT DOCUMENTS

EP 411 232 2/1991
EP 418 964 A1 3/1991
EP 441 702 8/1991
EP 058 482 8/1992
EP 551 016 7/1993
EP 581 317 2/1994
EP 605 208 7/1994
EP 629972 12/1994
EP 642060 3/1995
EP 649 074 4/1995
EP 650146 4/1995
EP 705 025 4/1996
EP 711061 5/1996
EP 0789480 8/1997
EP 1122939 8/2001
GB 2063018 5/1981
GB 2067871 7/1981
GB 2196167 4/1988
GB 2204984 11/1988
JP 4-248771 2/1992
JP 5-242217 9/1993
JP 8-30759 2/1996
WO WO 89/08915 9/1989
WO WO 93/25038 12/1993
WO WO95/04665 2/1995
WO WO 95/10835 4/1995
WO WO 95/14289 5/1995
WO WO 95/20291 7/1995
WO WO 96/26494 8/1996
WO WO 96/27259 9/1996
WO WO 01/08405 2/2001

OTHER PUBLICATIONS

U.S. patent application Ser. No. 09/198,022, Rhoads, filed Nov. 23, 1998.

Szepanski, "A Signal Theoretic Method for Creating Forgery–Proof Documents for Automatic Verification," Proceedings 1979 Carnahan Conference on Crime Countermeasures, May 16, 1979, pp. 101–109.

U.S. patent application Ser. No. 09/074,034, Rhoads, filed May 6, 1998.

U.S. patent application Ser. No. 09/127,502, Rhoads, filed Jul. 31, 1998.

U.S. patent application Ser. No. 09/185,380, Davis et al., filed Nov. 3, 1998.

U.S. patent application Ser. No. 09/293,601, Rhoads, filed Apr. 15, 1999.

U.S. patent application Ser. No. 09/293,602, Rhoads, filed Apr. 15, 1999.
U.S. patent application Ser. No. 09/342,972, Rhoads, filed Jun. 29, 1999.
U.S. patent application Ser. No. 09/428,359, Davis et al., filed Oct. 28, 2000.
U.S. patent application Ser. No. 09/431,990, Rhoads, filed Nov. 3, 1999.
U.S. patent application Ser. No. 09/465,418, Rhoads et al., filed Dec. 16, 1999.
U.S. patent application Ser. No. 09/562,524, Carr et al., filed May 1, 2000.
U.S. patent application Ser. No. 09/761,280, Rhoads, filed Jan. 16, 2001.
U.S. patent application Ser. No. 09/761,349, Rhoads, filed Jan. 16, 2001.
U.S. patent application Ser. No. 09/765,102, Shaw, filed Jan. 17, 2001.
Szepanski, "A Signal Theoretic Method for Creating Forgery–Proof Documents for Automatic Verification," Proceedings 1979 Carnahan Conference on Crime Countermeasures, May 16, 1979, pp. 101–109.
Chow et al, "Forgery and Tamper–Proof Identification Document," IEEE Proc. 1993 Int. Carnahan Conf. on Security Technology, 35–15 Oct., 1993, pp. 11–14 (copy in 51475).
Kawaguchi et al, "Principle and Applications of BPCS Steganography," Proc. SPIE vol. 3528, Multimedia Systems and Applications, 2–4 Nov., 1998, pp. 464–473.
Komatsu et al, "A Proposal on Digital Watermarking om Document Image Communication and Its Application to Realizing a Signature," Electronics and Communications in Japan, Part 1, vol. 73, No. 5, 1990, pp. 22–33.
Komatsu et al, "Authentication System Using Concealed Image in Telematics," Memoirs of the School of Science and Engineering, Wasdea Univ., No. 52, 1988, pp. 45–60.
Brown, "S–Tools for Windows, Version 1.00, .COPYRGT. 1994 Andy Brown, What is Steganography," Internet reference, Mar. 6, 1994, 6 pages.
Bruyndonckx et al., Neural Network Post–Processing of Coded Images Using Perceptual Masking, 1994, 3 pages.
Bruyndonckx et al., "Spatial Method for Copyright Labeling of Digital Images," 1994, 6 pages.
Burgett et al., "A Novel Method for Copyright Labeling Digitized Image Data," requested by e–mail from author (unavailable/password protected on IGD WWW site); received Sep. 18, 1995, 12 pages.
Caronni, "Assuring Ownership Rights for Digital Images, " Publishing in the Proceedings of Reliable IT Systems, VIS '95, HH. Bruggemann and W. Gerhardt–Hackl (Ed.), Vieweg Publishing Company, Germany, 1995, Jun. 14, 1994, 10 pages.
Caruso, "Digital Commerce, 2 plans for watermarks, which can bind proof of authorship to electronic works." New York Times, Aug. 7, 1995, one page.
Castro et al., "Registration of Translated and Rotated Images Using Finite Fourier Transforms,"IEEE Transactions on Pattern Analysis and Machine Intelligence, vol. PAMI–9, No. 5, Sep. 1987, pp. 700–703.
Choudhury, et al., "Copyright Protection for Electronic Publishing over Computer Networks," IEEE Network Magazine, Jun. 1994, 18 pages.
Clarke, "Invisible Code Tags Electronic Images," Electronic Engineering Times, Jun. 12, 1995, n. 852, p. 42.
"Copyright Protection for Digital Images, Digital Fingerprinting from FBI," Highwater FBI brochure, 1995, 4 pages.
"The Copyright Can of Worms Opened Up By The New Electronic Media,"Computergram Internations, pCGN07170006, Jul. 17, 1995 and "The Copyright Can of Worms Opened Up By the New Electronic Media—2," Computergram Internations, pCGN07210008, Jul. 21, 1995, 3 pages total.
Cox et al., "Secure Spread Spectrum Watermarking for Multimedia,"NEC Research Institute Technical Report, Dec. 5, 1995, 33 pages.
Cox et al., "A Secure, Imperceptable Yet Perceptually Salient, Spread Spectrum Watermark for Multimedia," IEEE, Southcon/96, Conference Recor, Pp. 192–197, 1996.
"Cyphertech Systems: Introduces Digital Encoding Device to Prevent TV Piracy," Hollywood Reporter, Oct. 20, 1993, p. 23.
Delaigle et al., "Digital Watermarking," Proc. SPIE—Int. Soc. Opt. Eng., vol. 2659, pp. 99–110. 1996.
Delaigle et al., "A Psychovisual Approach for Digital Picture Watermarking," 1995, 20 pages.
DICE Digital Watermark System, Q&A, Dec., 1995, 12 pages.
Digimarc presentation at RSA Conference, approximately Jan. 17, 1996, 4 pages.
Fimmerstad, "Virtual Art Museum," Ericsson Connexion, Dec., 1995, pp. 29–31.
Fitzgerald, "Invisible Digital Copyright ID, " Editor & Publisher, Jun. 25, 1994, p. 62.
"Foiling Card Forgers With Magnetic Noise," Wall Street Journal, Feb. 8, 1994.
Frequently Asked Questions About Digimarc Signature Technology, Aug. 1, 1995, http://www.digimarc.com, 9 pages.
Friedman, "The Trustworthy Digital Camera: Restoring Credibility to the Photographic Image,"IEEE Transactions on Consumer Electronic, vol. 39, No. 4, Nov., 1993, pp. 905–910.
Gabor, et al., "Theory of Communication," J. Inst. Elect. Eng. 93, 1946, pp. 429–441.
Hartung et al., Digital Watermarking of Raw and Compressed Video, Proc. SPIE 2952, Digital Compression Technologies and Systems for Video Communications, Oct., 1996, pp. 205–213.
Hecht, "Embedded Data Glyph Technology for Hardcopy Digital Documents," SPIE vol. 2171, Feb. 1994, pp. 341–352.
"Holographic signatures for digital images,"The Seybold Report on Desktop Publishing, Aug. 1995, one page.
Humphrey, "Stamping Out Crime," Hollywood Reporter, Jan. 26, 1994, p. S48.
Jain, "Image Coding Via a Nearest Neighbors Image Model," IEEE Transactions on Communications, vol. COM–23, No. 3, Mar. 1975, pp. 318–331.
Johnson, "Steganography," Dec. 10, 1995, 32 pages.
JPEG Group's JPEG Software (release 4), ftp.csua.berekeley.edu/pub/cypherpunks/applications/jsteg/jpeg.announcement.gz.
Kassam, Signal Detection in Non–Gaussian Noise, Dowden & Culver, 1988, pp. 1–96.
Koch et al., "Digital Copyright Labeling: Providing Evidence of Misuse and Tracking Unauthorized Distribution of Copyrighted Materials," Oasis Magazine, Dec. 1995, 3 pages.

Luc, "Analysis of Spread Spectrum System Parameters for Design of Hidden Transmission," Radioengineering, vol. 4, No. 2, Jun. 1995, pp. 26–29.
Machado, "Announcing Stego 1.0a2, The First Steganography Tool for the Macintosh, " Internet reference, Nov. 28, 1993, 3 pages.
Macq, "Cryptology for Digital TV Broadcasting," Proceedings of the IEEE, vol. 83, No. 6, Jun. 1995, pp. 944–957.
Matthews, "When Seeing is Not Believing," New Scientist, Oct. 16, 1993, pp. 13–15.
Matsui et al., "Video–Steganography: How to Secretly Embed a Signature in a Picture," IMA Intellectual Property Project Proceedings, Jan. 1994, vol. 1, Issue 1, pp. 187–205.
Mintzer et al., "Toward on–line, Worldwide Access to Vatican Library Materials" IBM J. Res. Develop. vol. 40 No. 2, Mar., 1996, pp.139–162.
Moller, et al., "Rechnergestutzte Steganographie: Wie sie Funktioniert und warum folglich jede Reglementierung von Verschlusselung unsinnig ist," DuD, Datenschutz und Datensicherung, Jun. 18, 1994 318–326.
"NAB—Cyphertech Start Anti–Piracy Broadcast Test, "Newsbytes, NEW032300023, Mar. 23, 1994.
Nakamura et al., "A Unified Coding Method of Image and Text Data Using Discrete Orthogonal Transform," Systems and Computers in Japan, vol. 21, No. 3, 1990, pp. 87–92.
Nakamura et al., "A Unified Coding Method of Dithered Image and Text Data Using Micropatterns," Electronics and Communications in Japan, Part 1, vol. 72, No. 4, 1989, pp. 50–56.
New Product Information, "FBI at AppleExpo"(Olympia, London), Nov., 1995, 2 pages.
Ohnishi et al., Embedding a Seal into a Picture Under Orthogonal Wavelet Transform, Proceedings of Multimedia '96, 1996, IEEE, pp. 514–521.
ORuanaidh et al, "Watermarking Digital Images for Copyright Protection," http://www.kalman.mee.tcd.ie/people/jjr/eva.sub.—pap.html, Feb. 2, 1996, 8 pages. (Also published Aug., 1996, IEE Proceedings–Vision, Image and Signal Processing, vol. 143, No. 4, pp. 250–256).
Pennebaker et al., JPEG Still Image Data Compression Standard, Chapter 3, "Aspects of the Human Visual System," pp. 23–27, 1993, Van Nostrand Reinhold, New York.
Pickholtz et al., "Theory of Spread–Spectrum Communications—A Tutorial," Transactions on Communications, vol. COM–30, No. 5, May, 1982, pp. 855–884.
Pitas et al., "Applying Signatures on Digital Images," IEEE Workshop on Nonlinear Image and Signal Processing, Neos Marmaras, Greece, pp. 460–463, Jun., 1995.
Port, "Halting Highway Robbery on the Internet," Business Week, Oct. 17, 1994, p. 212.
Roberts, "Picture Coding Using Pseudorandom Noise," IRE Trans. on Information Theory, vol. 8, No. 2, Feb., 1962, pp. 145–154.
Sapwater et al., "Electronic Copyright Protection," Photo>Electronic Imaging, vol. 37, No. 6, 1994, pp. 16–21.
Schneider, "Digital Signatures, Crytographic Algorithms Can Create Nonforgeable Signatures for Electronic Documents, Making Them Valid Legal Instruments"BYTE, Nov. 1993, pp. 309–312.
shaggy@phantom. com, "Hide and Seek v. 4.0" Internet reference, Apr. 10, 1994, 3 pages.
Short, "Steps Toward Unmasking Secure Communications" International Journal of Bifurcation and Chaos, vol. 4, No. 4, 1994, pp. 959–977.
Simmons, "Subliminal Channels; Past and Present," ETT, vol. 5, No. 4, Jul.–Aug. 1994, pp. 45–59.
Sheng et al., "Experiments on Pattern Recognition Using Invariant Fourier–Mellin Descriptors," Journal of Optical Society of America, vol. 3, No. 6, Jun., 1986, pp. 771–776.
Sklar, "A Structured Overview of Digital Communications—a Tutorial Review—Part I," IEEE Communications Magazine, Aug., 1983, pp. 1–17.
Sklar, "A Structured Overview of Digital Communications—a Tutorial Review—Part II," IEEE Communications Magazine, Oct., 1983, pp. 6–21.
"Steganography," Intellectual Property and the National Information Infrastructure The Report of the Working Group on Intellectual Property Rights, Sep. 1995, pp. 212–213.
Tanaka et al., "Embedding Secret Information Into a Dithered Multi–Level Image," Proc. IEEE Military Comm. Conf., Sep. 1990, pp. 216–220.
Tanaka, "Embedding the Attribute Information Into a Dithered Image," Systems and Computers in Japan, vol. 21, No. 7, 1990, pp. 43–50.
Tirkel et al., "A Two–Dimensional Digital Watermark," 1995, 6 pages.
Toga et al., "Registration Revisited," Journal of Neuroscience Methods, 48 (1993), pp. 1–13.
van Schyndel et al., "Towards a Robust Digital Watermark," ACCV '95, vol. 2, Dec., 1995, pp. 504–508.
Wagner, "Fingerprinting," 1983 IEEE, pp. 18–22.
Walton, "Image Authentication for a Slippery New Age," Dr. Dobb's Journal, Apr. 1995, pp. 18–26, 82–87.
"Watermarking & Digital Signature: Protect Your Work!" Published on Internet 1996, http://Itswww.epfl.ch/.about.jordan/watermarking.html.
Wise, "The History of Copyright, Photographers' Rights Span Three Centuries," Photo>Electronic Imaging, vol. 37, No. 6, 1994.
van Schyndel et al., "A Digital Watermark," IEEE International Conference on Image Processing, Nov. 13–16, 1994, pp. 86–90.
Zhao et al., "Embedding Robust Labels Into Images for Copyright Protection," Proc. of the International Congress on Intellectual Property Rights for Specialized Information, Knowledge and New Technologies (Vienna, Austria) Aug. 21–25, 1995, 10 pages.
Bender, "Applications for Data Hiding," IBM Systems Journal, vol. 39, No. 3–4, pp. 547–568, 2000.
Gruhl et al., "Information Hiding to Foil the Casual Counterfeiter," Proc. 2d Information Hiding Workshop, LNCS vol. 1525, pp. 1–15 (Apr. 15, 1998).
"Access Control and COpyright Protection for Images, WorkPackage 8: Watermarking," Jun. 30, 1995, 46 pages.
"Access Control and COpyright Protection for Images, WorkPackage 3: Evaluation of Existing Systems," Apr. 19, 1995, 68 pages.
"Access Control and COpyright Protection for Images, WorkPackage 1: Access Control and Copyright Protection for Images Need Evaluation," Jun., 1995, 21 pages.
"Access Control and COpyright Protection for Images, Conditional Access and Copyright Protection Based on the Use of Trusted Third Parties," 1995, 43 pages.
Arachelian, "White Noise Storm," Apr. 11, 1994, Internet reference, 13 pages.
Arazi, et al., "Intuition, Perception, and Secure Communication," IEEE Transactionson Systems, Man and Cybernetics, vol. 19, No. 5, Sep./Oct. 1989, pp. 1016–1020.

Arthur, "Digital Fingerprints Protect Artwork," New Scientist, Nov. 12, 1994, p. 24.

Aura, "Invisible Communication," Helskinki University of Technology, Digital Systems Laboratory, Nov. 5, 1995, 13 pages.

Bender et al, "Techniques for Data Hiding," Draft Preprint, Private Correspondence, dated Oct. 30, 1995.

Bender et al., "Techniques for Data Hiding," Massachusetts Institute of Technology, Media Laboratory, Jan. 1995, 10 pages.

Boneh, "Collusion–Secure Fingerprinting for Digital Data," Department of Computer Science, Princeton University, 1995, 31 pages.

Boney et al., "Digital Watermarks for Audio Signals," Proceedings of Multimedia '96, 1996 IEEE, pp. 473–480.

Boucqueau et al., Equitable Conditional Access and Copyright Protection for Image Based on Trusted Third Parties, Teleservices & Multimedia Communications, 2nd Int. Cost 237 Workshop, Second International Cost 237 Workshop, Nov., 1995; published 1996, pp. 229–243.

Brassil et al., "Hiding Information in Document Images," Nov., 1995, 7 pages.

* cited by examiner

METHODS OF PRODUCING SECURITY DOCUMENTS HAVING DIGITALLY ENCODED DATA AND DOCUMENTS EMPLOYING SAME

RELATED APPLICATION DATA

This application claims benefit of the Apr. 16, 1998, filing date of co-pending provisional application No. 60/082,228. This application is also a continuation-in-part of application Ser. No. 08/967,693, filed Nov. 12, 1997 (now Patent 6,122,392), which is a continuation of application Ser. No. 08/614,521, filed Mar. 15, 1996 (now U.S. Pat. 5,745,604), which is a continuation of application Ser. No. 08/215,289, filed Mar. 17, 1994, now abandoned, which is a continuation-in-part of application Ser. No. 08/154,866, filed Nov. 18, 1993, now abandoned. This application is also a continuation-in-part of application Ser. No. 08/951,858, filed Oct. 16, 1997 (now Patnet 6,026,193), which is a continuation of application Ser. No. 08/436,134, filed May 8, 1995 (now U.S. Pat. No. 5,748,763), which is a continuation-in-part of application Ser. No. 08/327,426, filed Oct. 21, 1994 (now U.S. Pat. No. 5,768,426), which is a continuation-in-part of application Ser. No. 08/215,289, filed Mar. 17, 1994, referenced above.

FIELD OF THE INVENTION

The present application relates to the use of digital watermarking in connection with paper currency and other security documents.

BACKGROUND AND SUMMARY OF THE INVENTION

The problem of casual counterfeiting of banknotes first arose two decades ago, with the introduction of color photocopiers. A number of techniques were proposed to address the problem.

U.S. Pat. No. 5,659,628 (assigned to Ricoh) is one of several patents noting that photocopiers can be equipped to recognize banknotes and prevent their photocopying. The Ricoh patent particularly proposed that the red seal printed on Japanese yen notes is a pattern well-suited for machine recognition. U.S. Pat. No. 5,845,008 (assigned to Omron), and U.S. Pat. Nos. 5,724,154 and 5,731,880 (both assigned to Canon) show other photocopiers that sense the presence of the seal emblem on banknotes, and disable a photocopier in response.

Other technologies proposed that counterfeiting might be deterred by uniquely marking the printed output from each color photocopier, so that copies could be traced back to the originating machine. U.S. Pat. No. 5,568,268, for example, discloses the addition of essentially-imperceptible patterns of yellow dots to printed output; the pattern is unique to the machine. U.S. Pat. No. 5,557,742 discloses a related arrangement in which the photocopier's serial number is printed on output documents, again in essentially-imperceptible form (small yellow lettering). U.S. Pat. No. 5,661,574 shows an arrangement in which bits comprising the photocopier's serial number are represented in the photocopier's printed output by incrementing, or decrementing, pixel values (e.g. yellow pixels) at known locations by fixed amounts (e.g. +/−30), depending on whether the corresponding serial number bit is a "1" or a "0."

Recent advances in color printing technology have greatly increased the level of casual counterfeiting. High quality scanners are now readily available to many computer users, with 300 dpi scanners available for under $100, and 600 dpi scanners available for marginally more. Similarly, photographic quality color ink-jet printers are commonly available from Hewlett-Packard Co., Epson, etc. for under $300.

These tools pose new threats. For example, a banknote can be doctored (e.g. by white-out, scissors, or less crude techniques) to remove/obliterate the visible patterns on which prior art banknote detection techniques relied to prevent counterfeiting. Such a doctored document can then be freely scanned or copied, even on photocopiers designed to prevent processing of banknote images. The removed pattern(s) can then be added back in, e.g. by use of digital image editing tools, permitting free reproduction of the banknote.

In accordance with aspects of the present invention, these and other current threats are addressed by digitally watermarking banknotes, and equipping devices to sense such watermarks and respond accordingly.

(Watermarking is a quickly growing field of endeavor, with several different approaches. The present assignee's work is reflected in the earlier-cited related applications, as well as in U.S. Pat. Nos. 5,841,978, 5,748,783, 5,710,834, 5,636,292, 5,721,788, and laid-open PCT application WO97/43736. Other work is illustrated by U.S. Pat. Nos. 5,734,752, 5,646,997, 5,659,726, 5,664,018, 5,671,277, 5,687,191, 5,687,236, 5,689,587, 5,568,570, 5,572,247, 5,574,962, 5,579,124, 5,581,500, 5,613,004, 5,629,770, 5,461,426, 5,743,631, 5,488,664, 5,530,759, 5,539,735, 4,943,973, 5,337,361, 5,404,160, 5,404,377, 5,315,098, 5,319,735, 5,337,362, 4,972,471, 5,161,210, 5,243,423, 5,091,966, 5,113,437, 4,939,515, 5,374,976, 4,855,827, 4,876,617, 4,939,515, 4,963,998, 4,969,041, and published foreign applications WO 98/02864, EP 822,550, WO 97/39410, WO 96/36163, GB 2,196,167, EP 777,197, EP 736,860, EP 705,025, EP 766,468, EP 782,322, WO 95/20291, WO 96/26494, WO 96/36935, WO 96/42151, WO 97/22206, WO 97/26733. Some of the foregoing patents relate to visible watermarking techniques. Other visible watermarking techniques (e.g. data glyphs) are described in U.S. Pat. Nos. 5,706,364, 5,689,620, 5,684,885, 5,680,223, 5,668,636, 5,640,647, 5,594,809.

Most of the work in watermarking, however, is not in the patent literature but rather in published research. In addition to the patentees of the foregoing patents, some of the other workers in this field (whose watermark-related writings can by found by an author search in the INSPEC database) include I. Pitas, Eckhard Koch, Jian Zhao, Norishige Morimoto, Laurence Boney, Kineo Matsui, A. Z. Tirkel, Fred Mintzer, B. Macq, Ahmed H. Tewfik, Frederic Jordan, Naohisa Komatsu, and Lawrence O'Gorman.

The artisan is assumed to be familiar with the foregoing prior art.

In the present disclosure it should be understood that references to watermarking encompass not only the assignee's watermarking technology, but can likewise be practiced with any other watermarking technology, such as those indicated above.

The physical manifestation of watermarked information most commonly takes the form of altered signal values, such as slightly changed pixel values, picture luminance, picture colors, DCT coefficients, instantaneous audio amplitudes, etc. However, a watermark can also be manifested in other ways, such as changes in the surface microtopology of a medium, localized chemical changes (e.g. in photographic emulsions), localized variations in optical density, localized changes in luminescence, etc. Watermarks can also be optically implemented in holograms and conventional paper watermarks.)

The foregoing and other features and advantages of the present invention will be more readily apparent from the following Detailed Description, which proceeds with reference to the accompanying drawings.

DETAILED DESCRIPTION

Watermarks in banknotes and other security documents (passports, stock certificates, checks, etc.—all collectively referred to as banknotes herein) offer great promise to reduce such counterfeiting, as discussed more fully below. Additionally, watermarks provide a high-confidence technique for banknote authentication.

Figure 1:
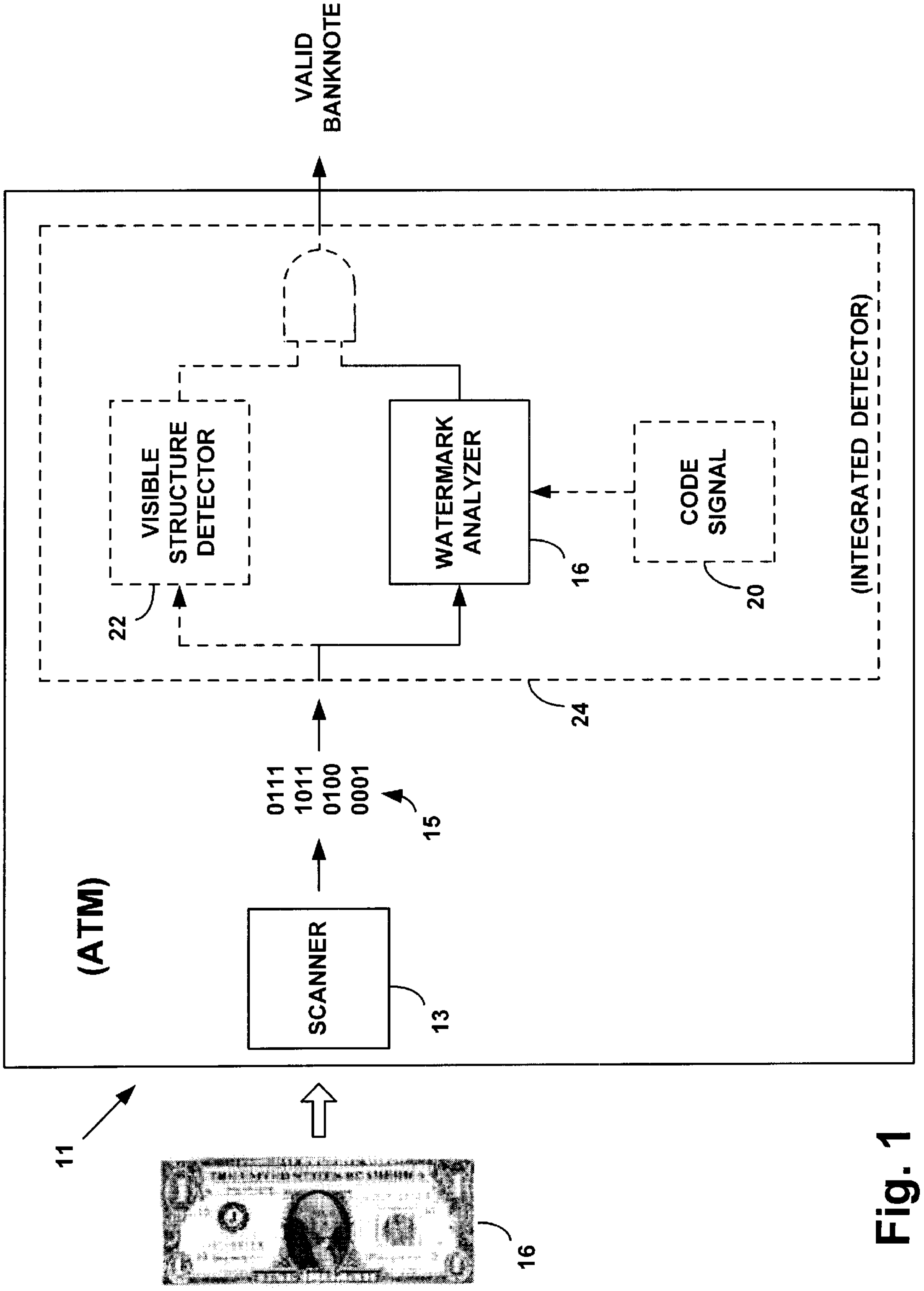
FIG. 1 shows part of an automatic teller machine employing principles of the present invention.

By way of example, consider an automatic teller machine that uses watermark data to provide high confidence authentication of banknotes, permitting it to accept—as well as dispense—cash. Referring to FIG. 1, such a machine (11) is provided with a known optical scanner (13) to produce digital data (15) corresponding to the face(s) of the bill (16). This image set (14) is then analyzed (16) to extract embedded watermark data. In watermarking technologies that require knowledge of a code signal (20) for decoding (e.g. noise modulation signal, crypto key, spreading signal, etc.), a bill may be watermarked in accordance with several such codes. Some of these codes are public—permitting their reading by conventional machines. Others are private, and are reserved for use by government agencies and the like. (C.f. public and private codes in the present assignee's issued patents.)

As noted, banknotes presently include certain visible structures, or markings (e.g., the seal emblem noted in the earlier-cited patents), which can be used as aids to note authentication (either by visual inspection or by machine detection). Desirably, a note is examined by an integrated detection system (24), for both such visible structures (22), as well as the present watermark-embedded data, to determine authenticity.

The visible structures can be sensed using known pattern recognition techniques. Examples of such techniques are disclosed in U.S. Pat. Nos. 5,321,773, 5,390,259, 5,533,144, 5,539,841, 5,583,614, 5,633,952, 4,723,149 and 5,424,807 and laid-open foreign application EP 766,449. The embedded watermark data can be recovered using the scanning/analysis techniques disclosed in the cited patents and publications.

Figure 2:
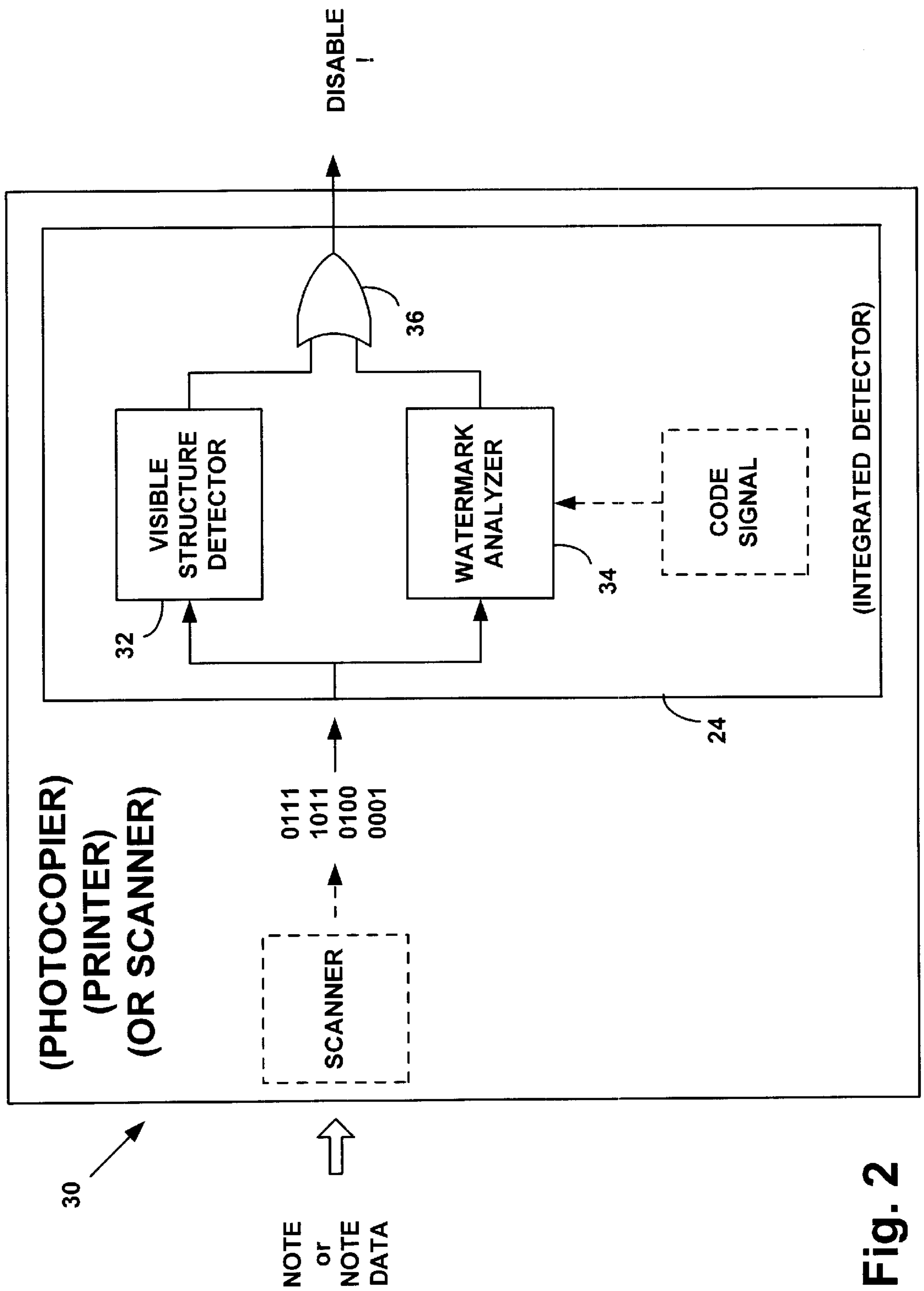
FIG. 2 shows part of a device (e.g. a photocopier, scanner, or printer) employing principles of the present invention.

To reduce counterfeiting, it is desirable that document-reproducing technologies recognize banknotes and refuse to reproduce same. Referring to FIG. 2, a photocopier (30), for example, can sense the presence of either a visible structure (32) or embedded banknote watermark data (34), and disable copying if either is present (36). Scanners and printers can be equipped with a similar capability—analyzing the data scanned or to be printed for either of these banknote hallmarks. If either is detected, the software (or hardware) disables further operation.

The watermark detection criteria provides an important advantage not otherwise available. As noted, an original bill can be doctored (e.g. by white-out, scissors, or less crude techniques) to remove/obliterate the visible structures. Such a document can then be freely copied on either a visible structure-sensing photocopier or scanner/printer installation. The removed visible structure can then be added in via a second printing/photocopying operation. If the printer is not equipped with banknote-disabling capabilities, image-editing tools can be used to insert visible structures back into image data sets scanned from such doctored bills, and the complete bill freely printed. By additionally including embedded watermark data in the banknote, and sensing same, such ruses will not succeed.

(A similar ruse is to scan a banknote image on a non-banknote-sensing scanner. The resulting image set can then be edited by conventional image editing tools to remove/obliterate the visible structures. Such a data set can then be printed—even on a printer/photocopier that examines such data for the presence of visible structures. Again, the missing visible structures can be inserted by a subsequent printing/photocopying operation.)

Desirably, the visible structure detector and the watermark detector are integrated together as a single hardware and/or software tool. This arrangement provides various economies, e.g., in interfacing with the scanner, manipulating pixel data sets for pattern recognition and watermark extraction, electronically re-registering the image to facilitate pattern recognition/watermark extraction, issuing control signals (e.g. disabling) signals to the photocopier/scanner, etc.

Figure 3:
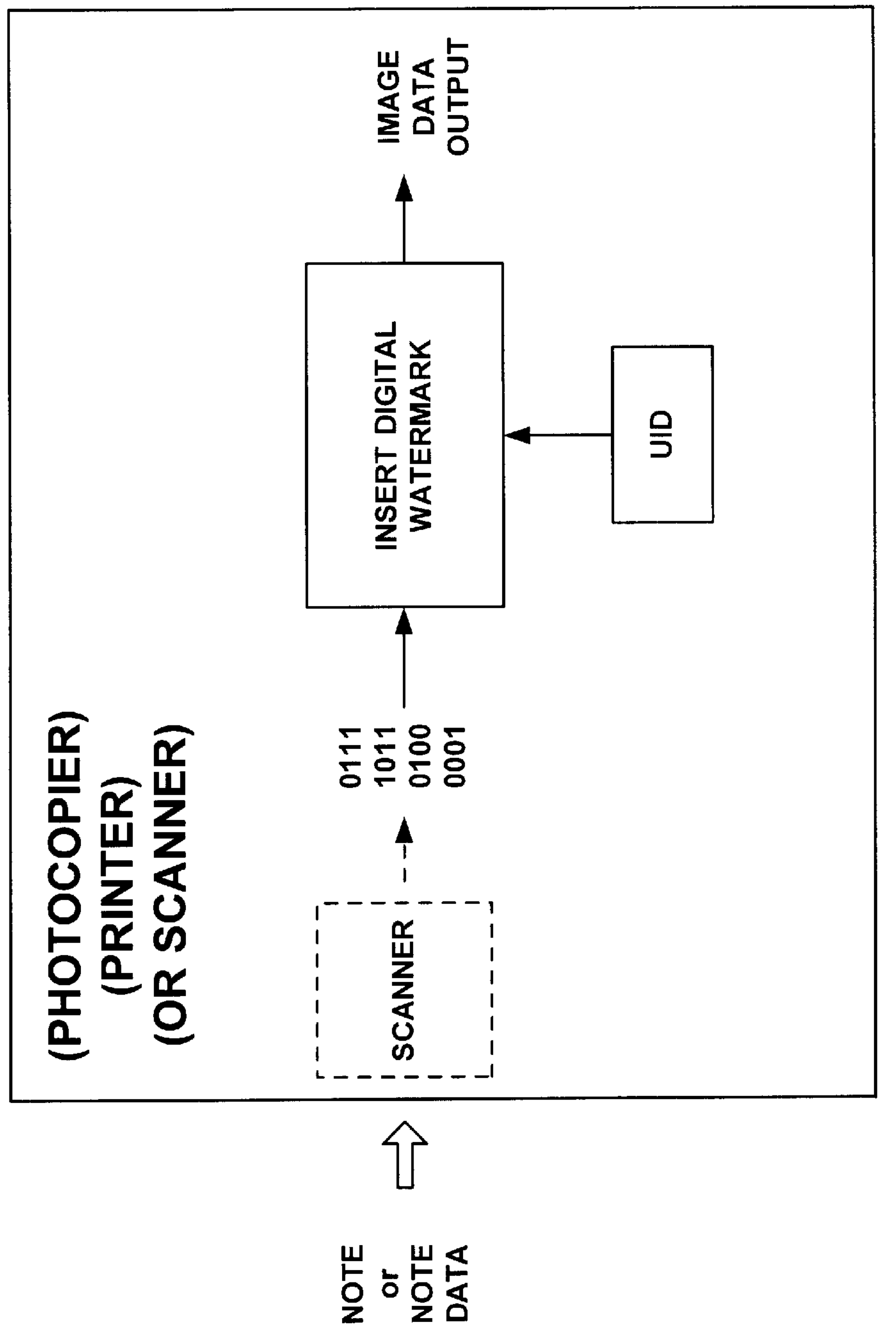
FIG. 3 shows part of another device employing principles of the present invention.

A related principle (FIG. 3) is to insert an imperceptible watermark having a universal ID (UID) into all documents printed with a printer, scanned with a scanner, or reproduced by a photocopier. The UID is associated with the particular printer/photocopier/scanner in a registry database maintained by the products' manufacturers. The manufacturer can also enter in this database the name of the distributor to whom the product was initially shipped. Still further, the owner's name and address can be added to the database when the machine is registered for warranty service. While not preventing use of such machines in counterfeiting, the embedded UID facilitates identifying the machine that generated a counterfeit banknote. (This is an application in which a private watermark might best be used.)

While the foregoing applications disabled potential counterfeiting operations upon the detection of either a visible structure or watermarked data, in other applications, both criteria must be met before a banknote is recognized as genuine. Such applications typically involve the receipt or acceptance of banknotes, e.g. by ATMs as discussed above and illustrated in FIG. 1.

The foregoing principles (employing just watermark data, or in conjunction with visible indicia) can likewise be used to prevent counterfeiting of tags and labels (e.g. the fake labels and tags commonly used in pirating Levis brand jeans, branded software, etc.)

The reader may first assume that banknote watermarking is effected by slight alterations to the ink color/density/distribution, etc. on the paper. This is one approach. Another is to watermark the underlying medium (whether paper, polymer, etc.) with a watermark. This can be done by changing the microtopology of the medium (a la mini-Braille) to manifest the watermark data. Another option is to employ a laminate on or within the banknote, where the laminate has the watermarking manifested thereon/therein. The laminate can be textured (as above), or its optical transmissivity can vary in accordance with a noise-like pattern that is the watermark, or a chemical property can similarly vary.

Another option is to print at least part of a watermark using photoluminescent ink. This allows, e.g., a merchant presented with a banknote, to quickly verify the presence of *some* watermark-like indicia in/on the bill even without resort to a scanner and computer analysis (e.g. by examining under a black light). Such photoluminescent ink can also print human-readable indicia on the bill, such as the denomination of a banknote. (Since ink-jet printers and other common mass-printing technologies employ cyan/magenta/yellow/black to form colors, they can produce only a limited spectrum of colors. Photoluminescent colors are outside their capabilities. Fluorescent colors—such as the yellow, pink and green dyes used in highlighting markers—can similarly be used and have the advantage of being visible without a black light.)

An improvement to existing encoding techniques is to add an iterative assessment of the robustness of the mark, with a corresponding adjustment in a re-watermarking operation. Especially when encoding multiple bit watermarks, the characteristics of the underlying content may result in some bits being more robustly (e.g. strongly) encoded than others. In an illustrative technique employing this improvement, a watermark is first embedded in an object. Next, a trial decoding operation is performed. A confidence measure (e.g. signal-to-noise ratio) associated with each bit detected in the decoding operation is then assessed. The bits that appear weakly encoded are identified, and corresponding changes are made to the watermarking parameters to bring up the relative strengths of these bits. The object is then watermarked anew, with the changed parameters. This process can be repeated, as needed, until all of the bits comprising the encoded data are approximately equally detectable from the encoded object, or meet some predetermined signal-to-noise ratio threshold.

The foregoing applications, and others, can generally benefit by multiple watermarks. For example, an object (physical or data) can be marked once in the spatial domain, and a second time in the spatial frequency domain. (It should be understood that any change in one domain has repercussions in the other. Here we reference the domain in which the change is directly effected.)

Another option is to mark an object with watermarks of two different levels of robustness, or strength. The more robust watermark withstands various types of corruption, and is detectable in the object even after multiple generations of intervening distortion. The less robust watermark can be made frail enough to fail with the first distortion of the object. In a banknote, for example, the less robust watermark serves as an authentication mark. Any scanning and reprinting operation will cause it to become unreadable. Both the robust and the frail watermarks should be present in an authentic banknote; only the former watermark will be present in a counterfeit.

Still another form of multiple-watermarking is with content that is compressed. The content can be watermarked once (or more) in an uncompressed state. Then, after compression, a further watermark (or watermarks) can be applied.

Still another advantage from multiple watermarks is protection against sleuthing. If one of the watermarks is found and cracked, the other watermark(s) will still be present and serve to identify the object.

The foregoing discussion has addressed various technological fixes to many different problems. Exemplary solutions have been detailed above. Others will be apparent to the artisan by applying common knowledge to extrapolate from the solutions provided above.

For example, the technology and solutions disclosed herein have made use of elements and techniques known from the cited references. Other elements and techniques from the cited references can similarly be combined to yield further implementations within the scope of the present invention. Thus, for example, holograms with watermark data can be employed in banknotes, single-bit watermarking can commonly be substituted for multi-bit watermarking, technology described as using imperceptible watermarks can alternatively be practiced using visible watermarks (glyphs, etc.), techniques described as applied to images can likewise be applied to video and audio, local scaling of watermark energy can be provided to enhance watermark signal-to-noise ratio without increasing human perceptibility, various filtering operations can be employed to serve the functions explained in the prior art, watermarks can include subliminal graticules to aid in image re-registration, encoding may proceed at the granularity of a single pixel (or DCT coefficient), or may similarly treat adjoining groups of pixels (or DCT coefficients), the encoding can be optimized to withstand expected forms of content corruption. Etc., etc., etc. Thus, the exemplary embodiments are only selected samples of the solutions available by combining the teachings referenced above. The other solutions necessarily are not exhaustively described herein, but are fairly within the understanding of an artisan given the foregoing disclosure and familiarity with the cited art.

(To provide a comprehensive disclosure without unduly lengthening the following specification, applicants incorporate by reference the patent documents cited herein.)

I claim:

1. A method of producing a banknote having digital data encoded therein, the method comprising: slightly altering an original image but without leaving any substantially human-apparent evidence of image alteration, and printing the banknote with the altered image, wherein visible light scanning of the banknote yields scan data from which the digital data can be decoded, yet rendering of the scan data for human viewing does not reveal the existence of said encoded digital data.

2. The method of claim 1 in which the digital data comprises plural bits.

3. The method of claim 2 in which said plural bits are encoded redundantly across the banknote, rather than the banknote being marked in a single localized region only.

4. The method of claim 1 in which the encoding makes use of a code signal.

5. The method of claim 1 in which the encoding makes use of a discrete cosine transform.

6. The method of claim 1 which includes encoding with two different digital watermarks.

7. The method of claim 6 in which the two different digital watermarks are of different robustness.

8. The method of claim 6 in which the two watermarks are encoded in accordance with different code signals.

9. The method of claim 1 which also includes providing the banknote with a hologram.

10. The method of claim 1 which includes encoding a calibration signal with the digital data.

11. The method of claim 10 in which the calibration signal is adapted to facilitate decoding of the digital data from the encoded banknote notwithstanding rotation.

12. A method of enhancing the security of a banknote, the method including digitally watermarking a banknote with machine readable, generally imperceptible, digital data, characterized by generating a pattern corresponding to said digital data, and physically texturing the surface of the banknote in accordance with said pattern, said texturing being independent of printing on the banknote.

13. The method of claim 12 in which said digital data comprises plural bits.

14. The method of claim 13 in which said plural bits are encoded redundantly across the banknote, rather than the banknote being marked in a single localized region only.

15. The method of claim 12 in which the encoding makes use of a code signal.

16. The method of claim 12 in which the encoding makes use of a discrete cosine transform.

17. The method of claim 12 which includes encoding with two different digital watermarks.

18. The method of claim 17 in which the two different digital watermarks are of different robustness.

19. The method of claim 17 in which the two watermarks are encoded in accordance with different code signals.

20. The method of claim 12 which also includes providing the banknote with a hologram.

21. The method of claim 12 which includes encoding a calibration signal with the digital data.

22. The method of claim 21 in which the calibration signal is adapted to facilitate decoding of the digital data from the encoded banknote notwithstanding rotation.

23. The method of claim 12 in which visible light scanning of the banknote yields scan data from which the digital data can be decoded, yet rendering of the scan data for human viewing does not reveal the existence of said encoded digital data.

24. A method of producing a security document having digital data encoded therein comprising: slightly altering an original image, said alterations varying across the image in accordance with local image characteristics rather than being uniform thereacross, and printing the security document with the altered image, wherein visible light scanning of the security document yields scan data from which the digital data can be decoded, yet rendering of the scan data for human viewing does not reveal the existence of said encoded digital data.

25. A method of producing a security document having digital data encoded therein, the method comprising: slightly altering an original image but without leaving any substantially human-apparent evidence of image alteration, and printing the security document with the altered image, wherein visible light scanning of the security document yields scan data from which the digital data can be decoded, yet rendering of the scan data for human viewing does not reveal the existence of said encoded digital data.

26. The method of claim 25 in which the digital data comprises plural bits.

27. The method of claim 26 in which said plural bits are encoded redundantly across the security document, rather than the security document being marked in a single localized region only.

28. The method of claim 26 in which the encoding makes use of a code signal.

29. The method of claim 26 in which the encoding makes use of a discrete cosine transform.

30. The method of claim 26 which includes encoding with two different digital watermarks.

31. The method of claim 30 in which the two different digital watermarks are of different robustness.

32. The method of claim 30 in which the two watermarks are encoded in accordance with different code signals.

33. The method of claim 25 which also includes providing the security document with a hologram.

34. The method of claim 25 which includes encoding a calibration signal with the digital data.

35. The method of claim 40 in which the calibration signal is adapted to facilitate deconding of the digital data from the encoded security document notwithstanding rotation.

36. The method of claim 25 wherein the security document comprises a passport.

37. The method of claim 25 wherein the security document comprises a check.

38. The method of claim 25 wherein the security document comprises a lable.

39. The method of claim 25 wherein the security document comprises a tag.

* * * * *

UNITED STATES PATENT AND TRADEMARK OFFICE

CERTIFICATE OF CORRECTION

PATENT NO. : 6,580,819 B1
APPLICATION NO. : 09/287940
DATED : June 17, 2003
INVENTOR(S) : Geoffrey B. Rhoads It is certified that error appears in the above-identified patent and that said Letters Patent is hereby corrected as shown below:

ON THE TITLE PAGE

Item (63), under “Related U.S. Application Data”, line 7:
Delete “now abandoned which” and insert --now abandoned; and--.

Item (63), under “Related U.S. Application Data”, line 8, after “Oct. 16, 1997,”:
Insert --which is a continuation of application No. 08/436,134, filed May 8, 1995, now Pat. No. 5,748,763,--.

Item (63), under “Related U.S. Application Data”, line 10:
Delete “5,768,426.” and insert --5,768,426, which is a continuation-in-part of application No. 08/215,289, filed Mar. 17,1994.--

Signed and Sealed this
Seventeenth Day of January, 2012

David J. Kappos
*Director of the United States Patent and Trademark Office*